Nov. 16, 1965 T. KILBURN ETAL 3,218,611
DATA TRANSFER CONTROL DEVICE
Filed April 18, 1961
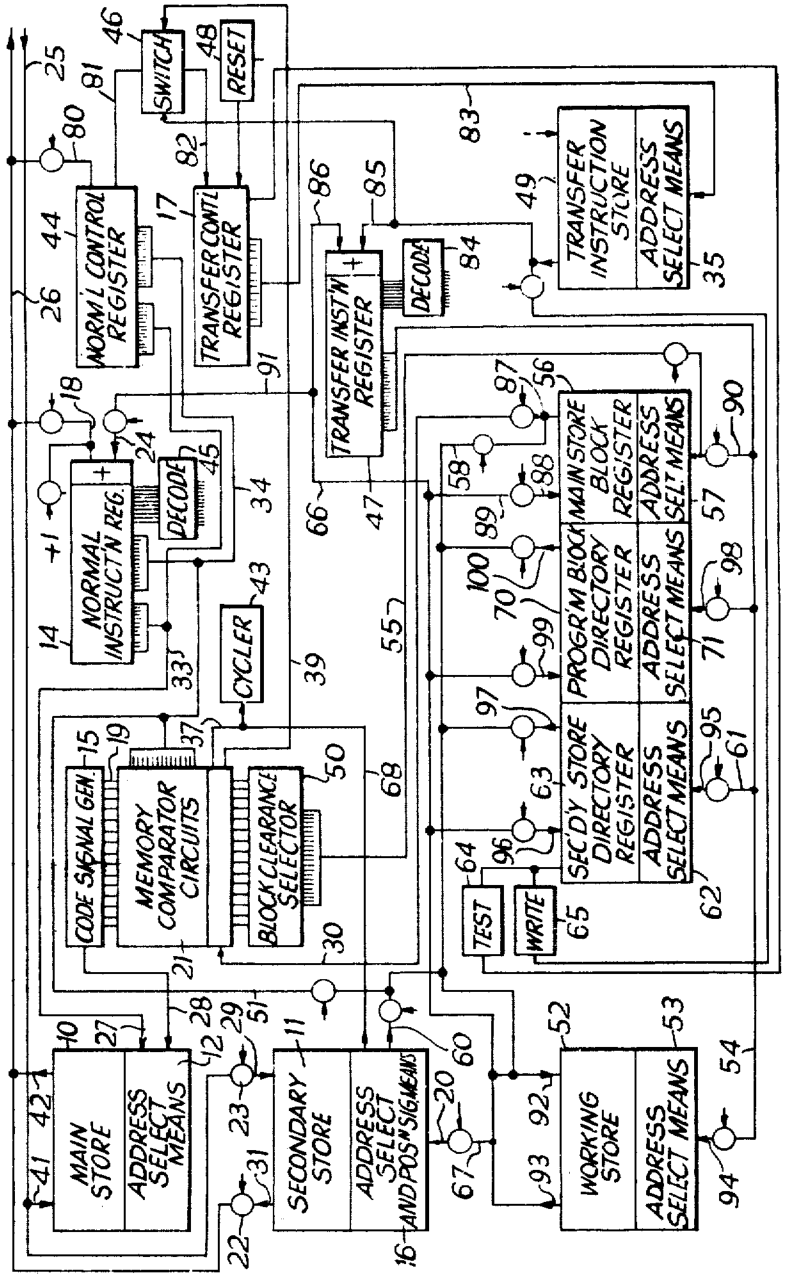
INVENTOR
Tom Kilburn
David Beverley George Edwards
BY
Cushman, Darby & Cushman
ATTORNEY

United States Patent Office 3,218,611

Patented Nov. 16, 1965

3,218,611

DATA TRANSFER CONTROL DEVICE

Tom Kilburn, Urmston, and David Beverley George Edwards, Chorlton-cum-Hardy, England, assignors, by mesne assignments, to International Business Machines Corporation, New York, N.Y., a corporation of New York Filed Apr. 18, 1961, Ser. No. 103,785
Claims priority, application Great Britain, Apr. 20, 1960, 13,854/60
24 Claims. (Cl. 340—172.5)

This invention relates to electronic digital computing machines and is more particularly concerned with improved word storage arrangements for the data to be used in such machines.

It is already well known and common practice to employ two or even more different types of data word storage, one, usually known as the main or high speed store, being that directly associated with the control and computing circuits of the machine and having only a limited word capacity but with either immediate or high speed of access to any word storage location therein, and the other or others, usually known as the secondary or backing store, providing a much larger word capacity but, by reason of the usual form of such stores, e.g. a magnetic drum or magnetic tape store, having a very much slow speed of access to any word storage location therein. Frequently the respective signalling speeds of the main and secondary stores are very different, the signalling speed of the main store being higher and synchronised with the normal signalling rhythm of the associated machine whereas the signalling speed of the secondary store is often relatively low.

With such main and secondary data word storage arrangements it is usual to transfer data words located in the secondary store into the main store before they can be used operatively within the machine. For convenience and saving of time such transfers are often effected in blocks of predetermined number of words, conveniently equal to the number of separate storage word locations in a discrete section of the main store, such as a magnetic core storage matrix. Since the different word storage locations of such main store section into which transfer is to take place are probably already occupied by other data words including answer words which have previously been obtained and which will be required subsequently, it is necessary also to arrange for the transfer of such existing words in the reverse direction, i.e. from the main store to the secondary store, before the transfer of fresh data words to the main store can take place. It is essential, furthermore, to be able to identify each individual word both before and after transfer and this is usually effected by the use of special transfer instructions forming part of the main order programme and which specify the particular addresses or address blocks concerned in the transfer in both stores. The programme compiler then has complete control and knowledge of the content of each word storage location in both stores at all times. When the secondary store is of the type in which the various word storage locations become available sequentially and the access speed store is accordingly low, the waiting period required for availability of a particular address or address block defined by the transfer instruction may result in considerable slowing of the average computing speed of the machine.

One object of the present invention is to provide a machine arrangement for reducing such delay.

In accordance with the invention, in an electronic digital computing machine which includes an immediate or high access speed main data word store, a secondary data word store of the type in which the various storage locations or addresses become available sequentially, word transfer channels between said main and said secondary stores and control means for effecting transfer of data words from said secondary store to said main store and from said main store to said secondary store, said control means is arranged to transfer each data word from said main store into that vacant one of the address locations of said secondary store which is next available after the time of a requirement to effect transfer while there is also provided a directory register for recording the programme identification address of said data word and the secondary store address to which said data word has been transferred.

Such directory register is for subsequent use in translating a control address signal demanding the same particular programme address location into selection of the actual location in the secondary store where the data word identified by such programme address has been recorded.

The above feature is of particular application to arrangements of the kind described in the co-pending Kilburn application Serial No. 95,379, filed March 13, 1961, in which a unique address identification (identity) definable in any instruction or order is assigned to every available word storage location provided in both the main and the whole or a part of the secondary store of the machine. By arranging that certain digits of any address signal always define a different particular one location within a group or block of address locations of predetermined number, e.g. 512, and then defining each separate (512 word) block by means of further digits of such address signal, the above mentioned directory register need only deal with the latter, i.e. the block-identifying digits when, as is preferably the case, any transfer operation is concerned only with one or more complete blocks.

In order that the above and other features of the invention may be more readily understood, one embodiment thereof will now be described by way of illustrative example only and with reference to the accompanying drawing whose single figure is a block schematic diagram illustrating the principal components of an electronic digital computing machine having a data word storage arrangement according to the invention.

The machine about to be described is one arranged for operation in the parallel mode and with binary form numbers. Accordingly, where reference is made to a "multiple," such term is to be construed as meaning a group of separate conductors, one for each signalled digit value, while reference to "gate means" in association with such multiples is intended to mean the control by gate circuit means, i.e. by And gates, of all of the separate digit leads of the multiple by means of one of more control signals. Such multiples or conductor groups are shown in the drawings only as a single line and the respective gate circuit means therefor as a single encircled G, while, in the interests of clarity, the various gate control signal connections and other elements have been omitted since their construction and arrangement follow the now well known forms and practices of the art.

The embodiment shown comprises a main or high access speed store 10, a secondary store 11, a normal instruction or order register 14 with an associated normal control register 44 for normal machine control purposes during execution of a computing programme, a separate transfer control register 17 and an associated transfer instruction register 4%, a memory-comparator circuit 21 and an associated code signal generator 15, a main store block clearance selector device 50 and a group of special word storage registers including a transfer instruction store 49, a main store block register 56, which aids in performing the directory function, a secondary store directory register 63, a programme block directory register 70 and a so-called working store 52.

As it is a feature of this invention that an address as defined by the address digits of an instruction or order has no constant relationship to any one or any particular group of storage locations within the machine, it is pointed out that when, hereinafter, reference is made to a "programme" addresss number or a "programme" block number, the intention is to refer to the address digit configuration or identifier as used in the order or instruction of the programme for a particular computing operation being performed, whereas reference to a "store" block number or a "store" address, means the address indentification of a particular word storage location (address per se) or a particular group of separate storage locations within a particular piece of apparatus.

The main store 10 conveniently comprises eight magnetic core storage matrices each capable of registering 1024 data words in the form of 16 blocks of 512 words each. Address selection within the main store 10 is by address select means 12 which may comprise the usual diode tree circuits. Selection of a desired one of the 16 store block positions is effected by a group of eleven digit signals *d*12 . . . *d*22 of an address coded by generator 15 into the corresponding one of 16 different 4-digit signals which are applied by way of an input multiplier 28. The similar selection of any desired single word storage location in any selected block in store 10 is effected by a group of nine digit signals *d*3 . . . *d*11 of the same address and applied by way of input multiple 27. The write input multiple of the main store 10 is indicated at 41 and the read-out multiple at 42.

The secondary store 11 conveniently consists of one or more magnetic drum stores capable of providing 512 separate block storage locations available sequentially and each capable of registering a block of 512 separate words. Selection within the secondary store 11 is effected on a block basis only by address select means 16 which may again be of any well known form and include means for providing an output signal $\theta$ which is indicative of the store address of the next block storage location which will become available and is in the form of a group of address digit signals corresponding to those of register 14 for the same block. In addition, such address select means 16 include a coincidence testing circuit to which the said $\theta$ signal is applied for comparison with a block address signal fed to the input 20. When coincidence is established, a signal is emitted over lead 68. The said $\theta$ signal is also available externally on lead 60. The write input multiple to the secondary store 11 is indicated at 29 while the read output multiple is shown at 31. The latter is connected by way of transfer gate 22 to the write input 41 of main store 10 while the write input of the store 11 is fed through transfer gate 23 from the read output multiple 42 of the main store 10.

The precise form of the main and secondary stores is of no concern to the present invention.

The write input multiple 41 and the read output multiple 42 of the main store 10 are also connected in the usual way to highways 25 and 26 respectively feeding the other parts of the machine including the normal instruction and control registers 14, 44 and the computing circuits (not shown).

The normal instruction register 14 may be of any known form, for instance, a group of trigger circuits one for each digit signal to be registered and providing the necessary address and function controlling signal outputs according to the value of the different digits of an instruction signal therein. This register 14 includes add or subtract means for combining a first instruction signal with a modifying signal in known manner. The normal instruction signal input is shown at 24 and the modifier signal input at 18. Associated with the function signal outputs of this register is the usual decode circuits indicated at 45 to provide the necessary control and other signals for operating the machine in accordance with the applied instruction. The word and block address signal outputs are fed over multiples 33, 34 to the address select means 12 and memory comparator circuits, respectively.

The associated normal control register 44 is again of any suitable known form comprising, for instance, a group of counter connected trigger circuits which can be set according to the digit configuration of an applied input signal on the multiple 80 and progressively altered during machine operation to define the addresses of the various successive orders of a programme. This control register is arranged to be capable of being immobilised by an input signal on lead 81 from switch device 46 referred to later. The respective word and block address defining digit signal outputs from this control register are also fed over multiples 33 and 34 to the address select means 12 and memory comparator circuits in parallel with those from the instruction register 14.

The separate transfer control register 17 is of a form substantially identical to that of the register 44 and is also arranged to be capable of being immobilised by a signal from the switch means 46 over lead 82. This transfer control register 17 is also arranged to be capable of being reset to a particular chosen digit configuration by reset device 48. Like the control register 44, this transfer control register also includes the usual arrangements for progressively altering the control number stored therein after the end of each operation cycle so as, normally, to select the next order of the series. The various digit signal outputs from the control register 17 are applied over multiple 83 to the address select means 35 of the transfer instruction store 49.

The transfer instruction register 47 is basically similar to that of the normal instruction register 14 and includes function decode means 84 operated by the function digit signals of an applied instruction to provide control potentials to various gate and other devices operative during the automatic transfer cycle. The instruction signal input to the instruction register 47 is indicated at 85 while the modifier input is shown at 86.

The memory comparator circuit 21 is described in detail in the aforesaid co-pending application and effectively comprises sixteen separate banks of combined trigger and equivalence detecting circuits. One input to each equivalence detecting circuit is derived from the associated trigger circuit whereas the other input is provided by the related address digit signal of the block identifying group provided over multiple 34 from the instruction register 14 or the similar outputs of the control register 44.

Each trigger circuit in each bank of the memory comparator circuit is arranged to be set to one or the other of its two alternative states in accordance with the related digit value of the block identifying address signal, such setting inputs being fed by way of multiple 30 from the register 56. Each bank of the memory comparator circuit has an individual output lead 19 which is energised if, but only if, the setting states of all of the memory trigger circuits of that bank coincide with the applied digit signals on multiple 34. When such coincidence occurs, the corresponding output signal on the related lead 19 provides an input to the code signal generator 15 which is again of the form as described in said co-pending application. This signal generator effectively provides, in response to energisation of any input lead 19, a 4-digit signal combination within the range 0000, 0001 . . . 1111 according to the particular bank of the memory comparator circuit 21 where coincidence has been established. Such 4-digit signal from the code signal generator forms the block identifying signal input to lead 28 of the address select means 12. In addition, the memory comparator circuit 21 provides an output on lead 37 when coincidence is established in any one of the banks or, alternatively, provides a non-equivalent output signal on lead 39 when there is failure to establish coincidence in any one of the banks of trigger circuits.

The main store block clearance selector device 50 is for selecting one of the block positions of the main store 10 for clearance whenever space is required in the main store to receive a new work block from the secondary store 11. This device 50 may take any one of a number of different forms according to the chosen system of selecting a block for clearance. One simple arrangement is to select each of the sixteen main store blocks for clearance in turn in which case the device 50 merely comprises a 16 stage ring counter stepped on one step at each transfer operation to render each of its 16 stages operative in turn to energise the related one of a group of 16 outputs forming a multiple 55. Yet another embodiment may comprise a series of combined pulse counter and time delay circuits, one for each bank of the memory comparator circuit. Each of these circuits is arranged to have its count state advanced one step whenever coincidence is established in the associated bank of the memory comparator circuit 21 and is also arranged to have its count state progressively reduced at an appropriate rate on a machine operation time basis. With this embodiment the particular bank which is used most frequently will have the highest count state of any moment and that which is used least frequently will have the lowest count state. When an output is required to indicate the bank to be cleared, an examination is made of the different combined pulse counter and time delay circuits to determine which has the lowest level output and the appropriate one of the output leads of multiple 55 is then energised to provide a signal to the address select means 57 of register 56.

The register 56 comprises a multi-address word storage device of any convenient type, for example, a magnetic core store matrix, and its associated address select means 57 again may comprise diode tree circuits of known form. This register has 16 separately identifiable storage locations, one for each of the block positions of the main store 10, and each is selectable through the address selection means 57 by the particular lead of the multiple 55 which is energised from the device 50. This register has a read output at 87 and a write input at 88. The read output 87 is connected over multiple 58 to the write input of the working store 52 and, as already mentioned, by way of multiple 30 to the setting input of the memory comparator circuit 21. The write input 88 is supplied over multiple 89 from the read output of the working store 52. The input to the address selection means 57 also is capable of being supplied with controlling input signals over multiple 90 from the transfer instruction register 47.

The working store 52 is again a multi-address word storage device, for example, one or more magnetic core storage matrices with associated address selection means 53 which again may be a usual diode tree circuit form. The write input to the store is indicated at 92 while the read out is indicated at 93. The address selection input at 94 is supplied over multiple 54 from the transfer instruction register 47. This working store is used as a temporary and operational storage during the various steps of the transfer operation and various exclusive address locations therein will be referred to later as word locations *w*1, *w*2, *w*3 . . . .

The secondary store directory register 63 comprises a further multi-address word storage device, again conveniently in the form of a magnetic core storage matrix and has associated address selection means 62 whereby any word storage location may be selected by an address signal on multiple 95. The write input to this store is indicated at 96 and the read output at 97. This store is provided with a number of separate word storage locations equal to the number of block storage positions in the secondary store 11 and each arranged to record the programme address number (i.e., identity) of the contents, if any, of a related one of the block storage positions in the secondary store. In each of these addresses there is also provided means for registering a further digit, known as the "full/empty" digit, which indicates whether the related block position in the secondary store 11 is actually occupied or is empty. Associated with the said full/empty digit positions of the register is a test circuit 64 whose purpose is to examine the value "0" or "1" of said full/empty digit and to provide an output signal indicating the tested value. Also associated with these digit positions is a write circuit 65 by which the value of the digit may be altered from "0" to "1" when a block, already vacant, is filled, or conversely from "1" to "0" when the block, already full, is emptied.

The programme block directory register 70 is similar in form to the register 63 and comprises a multi-address word store, again conveniently of a magnetic core storage matrix, providing a number of separate word storage positions equal to the number of block positions in the secondary store 11. The associated address select means 71 are again of a form similar to that of the means 62 of store 63 whereby any required word storage location can be selected by an input on multiple 98. The address selection input in this case is the programme block number (i.e., identifier) of any word block identified in the instruction programme while in the associated storage position is located a store block number indicative of the position (address per se) of the required programme block in the secondary store 11. The write input to this register 70 is over multiple 99 and the read output over multiple 100.

As will be seen from the drawing, the respective address signal inputs to the address select means 62, 71 and 57 are all supplied through gate control means from the transfer instruction register 47. The read output 93 of the working store 52 is connected by way of multiple 67 to the address selection input 20 of the secondary store address selection means 16 and also to the write inputs 96, 99 and 88 of the registers 63, 70 and 56 and also by way of multiple 66 to the modifier input 86 of the transfer register 47 and by way of multiple 91 to the normal instruction register 14. Multiple 51 which is an extension of multiple 34, provides a connection from the block digit signal output of the instruction register 14 to the write input 92 of the working store 52 while the $\theta$ signal output 60 of the address selection means 16 is also connected to this write input 92, as are also the read outputs 97, 100 and 87 of the registers 63, 70 and 56.

The transfer instruction store 49 may be of any convenient form but as it is not normally necessary or even desirable to alter the form of any word stored therein, such store may be of fixed type comprising, for instance, a number of separate magnetic core devices having a removable magnetic core slug whereby the desired word configuration of each address location may be set by hand and not changeable otherwise. Such store has associated therewith address selection means 35 of any convenient form and whose address selection signal input is derived from the digit signal output of the transfer control register 17 over multiple 83.

The manner of operation of the arrangements described above is as follows. Normal machine operation follows the customary course of using the control number in the normal control register 44 to identify the address of the next instruction or order of computing programme by applying the necessary address selection signals to the address selection means 12 of the main store 10. Such address selection signals consist of (1) the block identifying signals which are fed to the memory comparator circuit 21 to produce the requisite 4-digit output signal from the code signal generator 15 which then feeds the block select input 28 of the address selection means 12, and (2) the separate word identifying signals which are fed direct to the input 27 of such address selection means via multiple 33. From the address in the main store 10 thus selected is then read out the required next instruction into the normal instruction register 14 which then becomes effective to select the address within the main store 10 of the required number or data word called for by the instruction. This selection is again by application of the word identifying digit signals set up on the register 14 direct to the address selection input 27 of the address selection means 12 and the block identifying signals to the memory comparator circuit 21 thereby to produce the requisite 4-digit block identifying signal from the code signal generator 15. The function digit signals of the same instruction in the register 14 are effective, in the usual way, upon the function decode means 45 to provide the gate and other control signals as necessary to carry out the required computing operation. After completion of the operation defined by the instruction, the next instruction of the programme series is selected in like manner, usually by altering the control number held in the control register 44 by adding or subtracting "1," but on certain other occasions, such as under conditional transfer conditions, by feeding a new control number to the control register 44. The various steps involved in carrying out each programme instruction are completed in turn under the timing imposed in known manner by the cycler or timing controller 43.

In the above it has been assumed that, in each case, the ordered instruction and number or data words are already located in the main store 10. In these circumstances, equivalence is established within the memory comparator circuit 21 and the consequential equivalence signal over lead 37 forms one of the control inputs to the cycler 43. If, on the other hand, a particular numbered block of the word demanded by the output address selection signals from either the control register 44 or the instruction register 14 is not already registered in the main store 10, then coincidence will fail to be established in any one of the different banks of the memory comparator circuit 21 indicating that a block of date words containing the required word must be transferred from its present location in the secondary store 11 into one of the block positions within the main store 10.

Such failure to establish coincidence within the memory comparator circuit 21 causes the emission of a non-equivalent signal over lead 39 to switch means 46 and initiates the operation to effect an automatic transfer. Such automatic transfer has to find out where the required word is in the secondary store 11 and then transfer it into the main store 10 after having first cleared a suitable block position of the latter by transferring the existing contents of such block into the secondary store 11 with corresponding recordings in the directory registers 63 and 70 and in the block register 56. The automatic transfer operation will now be described in some detail.

The operation of the switch means 46 effectively transfers control of machine operation from the normal control register 44 and instruction register 14 to the separate transfer control register 17 and its associated instruction register 47. The normal control register 44 remains set at the particular computing programme control number which called for the non-available data word. Transfer control register 17 has, as already described, already been reset by reset means 48 to a predetermined number which identifies the address within the transfer instruction store 49 of the first of a series or sub-routine of special transfer controlling instructions or orders which are recorded at sequential address locations in the store 49. Thus the transfer sub-routine now becomes operative instead of the normal computing programme and during its period of control the various successive transfer orders held in the store 49 are selected in turn by the progressively changing setting of the transfer control register 17 and are fed from the store 49 to the transfer instruction register 47 to control machine operation in the manner precisely analogous to that of normal machine operation under the control of the control register 44 and instruction register 14.

The transfer operation steps are briefly as follows. To simplify description, the block number of the main store 10 which is chosen by the device 50 for clearance will be referred to as MSC; the programme block number (identifier) of the already present contents of such block position MSC of the main store 10 will be referred to as PBT; the programme block number (identifier) of the new block defined by the block address digits of the instruction initially held in the normal instruction register 14 and which is required to be transferred from the secondary store 11 to the main store 10, will be referred to as PBR; the block number (address) of the secondary store 11 where such desired block PBR is actually located will be referred to as SSR; the symbol $\theta$ will be used to refer to the signal emitted on lead 60 and indicating the next block position which will become available in the secondary store 11 while the term $\theta$E will be used to define that block position in the secondary store 11 which has been detected as being empty and the next-to-become available after the instant of testing. In addition, the various separate word address locations of the working store 52 used during the transfer process will be referred to as $w1$, $w2$, $w3$, $w4$ . . . .

The first step is to transfer PBR from the instruction register 14 into register $w1$ of the working store 52 over multiples 34 and 51.

The next step is to use the MSC output from device 50 as an address select signal over multiple 55 to address select means 57 to render operative the related storage position in main store block register 56. The content of this particular location is PBT which is then read from register 56 over multiple 58 and written into address $w2$ of the working store 52.

The next step is to read the signal $\theta$ from the address select means 16 of the secondary store 11 over multiple 60 into address $w3$ of the working store 52. This signal $\theta$ is then read out from the working store over multiples 93 and 66 to the modifier input 86 of the transfer instruction register 47 to form the address section of the next instruction which thereafter becomes operative as an address signal to address selection means 62 of the secondary store directory register 63. With this address operative, the full/empty digit therein is examined by test means 64 to determine whether the next available block in secondary store 11 is empty or not. If it is empty, operation will be as described later. If it is found to be full then the next step is to alter the signal $\theta$ in address $w3$ of the working store 52 to $\theta+1$, and then to repeat the above operations of selection in the register 63 and the accompanying test of the full/empty digit by test means 64 until at some later block address in the register 63 an "empty" digit is found. This address $\theta+n$ is thus the address $\theta$E which identifies the next available empty block position in the secondary store 11 and is, of course, held on address $w3$ of the working store 52. Had the first test revealed an empty digit, then the original $\theta$ signal then registered on address $w3$ of the working store would become the address signal $\theta$E.

In the next step, $\theta$E is read out from $w3$ in the working store 52 over multiples 93 and 66 to modifier input 86 of the transfer instruction register 47 to form the address part of a transfer instruction which again selects the relevant address in the secondary store directory 63. With this address selected, the previously detected "empty" digit is altered to the "full" state by operation of write means 65 while PBT from address $w2$ of the working store 52 is written into the block address storage position of this location in the directory register 63 by way of multiples 93 and 96.

In the next step, PBT from address $w2$ of the working store 52 is fed over multiples 93 and 66 to the modifier input 86 of the transfer instruction register 47 to form the address part of an instruction to select, in the programme block directory register 70, that address location which is related to the particular programme block number PBT. With this address selected, the signal θE is then read from address w3 in the working store 52 and is written into the selected block position over multiples 93 and 99. The same PBT signal is read from address w2 of the working store 52 by way of multiples 93 and 66 into the normal instruction register 14; in this instruction register, the word selection digits and the function digits will all be zero.

The next step is to read θE from address w3 of the working store 52 by way of multiples 93 and 67 to the address selection input 20 of the address select means 16 of the secondary store 11 so as to set up the latter with the required block number and thereafter to await the coincidence with this particular block number of the continuously changing θ signal from the secondary store. When such coincidence occurs the output signal on lead 68 to the cycle control 43 allows the transfer operation to proceed, such transfer operation being controlled by the transfer instruction register 47 so as to read each successive address 0, 1, 2, 3, . . . of the word block PBT in the main store 10 over the transfer path through transfer gate 23 to the write input 29 of the secondary store 11, the relevant block position in the main store 10 being selected by the signals provided by normal instruction register 14, the various word selection digit signals being altered between successive word transfers by supplying add pulses to the modifier input 18 of such register under the control of the instruction register 47.

When such main store to secondary store transfer is complete, the signal MSC from the device 50 is again employed, by application over multiple 55 to means 57, as an address selection means for the register 56 to select the related storage position in the latter; when selected, PBR is read from address w1 of the working store 52 and written into this position of the register 56 as a record of the new contents of the main store block concerned.

In the next following step, PBR is read out from address w1 of the working store 52 by way of multiples 93 and 66 to the modifier input 86 of the transfer instruction register 47 to form the address portion of an instruction which is then operative upon the address selection means 71 of the programme block directory register 70 to select the address location therein related to the particular programme block number and from this selected address is read out SSR, namely the block number position in the secondary store 11 where the required PBR is located. This is read out to address w4 of the working store 52 over multiples 100 and 92. This number is then erased from this address location in the register 70.

In the next operation from address w4 of the working store 52, SSR is read over multiples 93 and 66 to the modifier input 86 of the transfer instruction register 47 to form the address section of an instruction which is then operative on the address selection means 62 of the secondary store directory register 63 to select the address position related to the required block. The block address signal in this address is then erased and the related full/empty digit altered to the "empty" state.

The same number SSR is then read out from address w4 of the working store 52 by way of multiples 93 and 66 to the input 24 of the normal instruction register 14, the word address and function digits again being all zero. The same signal SSR is also read out from w4 of the working store 52 over multiples 93 and 67 to the address select input 20 of the address selection means 16 of the secondary store to set up the latter with the required store block number to await coincidence with the eventual arrival of a corresponding θ signal. When this θ signal occurs, the resultant coincidence signal on lead 68 initiates the opposite direction transfer from the secondary store 11 through transfer gate 22 to the write input 41 of the main store 10, starting at word position 0 of block MSC and transferring each word in turn in sequential steps governed by the transfer instruction register 47 in a manner similar to that involved in the previous transfer in the opposite direction.

In the next step, MSC from device 50 is again used to select the related address in the main store block register 56 and the PBR signal therein is read out by way of multiple 30 to reset the related bank of trigger circuits of the memory comparator circuit 21.

When transfer is completed, the switch means 46 is reset to its original state by a signal from the transfer store 49 whereby the machine reverts to the previous condition where the normal instruction register 14 and the normal control register 44 are operative and the transfer instruction register and transfer control register 17 are immobilised. The normal control register 44 still contains the number of the last programme instruction address which initiated the automatic operation and this is then re-applied over multiples 33 and 34 to the address select means 12 of the main store 10. Since the memory comparator circuit 21 now contains a trigger circuit bank (that of block MSC) whose setting states correspond precisely with those of the required block number PBR, coincidence is established and the code signal generator 15 provides the requisite 4-digit signal over multiple 28 to select the block which has just been transferred from the secondary store 11. Normal machine operation takes place thereafter.

In brief résumé of the above, two addressable stores, a main store 10 and a secondary store 11 are provided with two-way channels so that data stored in either one can be transferred to the other.

If during normal operation, a search is made for a certain piece of desired data in the main store, identified for example, by the "identifier" PBR, and if this desired and so identified data is *not* found, it is necessary to initiate a transfer operation. During such transfer operation, a location in the main store is cleared of the data therein at an *address* represented, for example, by MSC, the piece of data thereat, having the "identifier" PBT. This PBT data will be transferred out of the main store to thus clear the MSC address and the PBT identified data will be stored in the first available, empty address in the secondary store, which address can be represented by θ. The desired data whose "identifier" can be represented by PBR is located, at an address, in the secondary store, which may be represented by SSR. Under control of SSR, this data (identified by PBR) will be transferred to the address MSC in the main store and will then be found there, when normal operation is resumed.

The block clearance selector 50 selects the location MSC, in the main store, which is to be cleared.

To keep track of where a certain identified piece of data is located at any certain time, a three part directory 63, 70 and 56 is provided, each part being addressable for storing certain directory data at their addresses.

Manifestations of *addresses* in main store 10 (for example MSC) are employed in directory 56 to control the selection of a location therein, at which is located an "identifier" of the piece of data stored therein, for example, PBT. These "identifiers" can be written in, read out or erased.

Manifestations of identities (such as PBT or PBR) are employed in directory 70 to control the selection of allocated locations therein, at which locations, respectively, is stored the *address*, in the secondary store, at which the correspondingly identified piece of data is stored. Such *addresses* can be written in, read out or erased.

Manifestations of addresses in the secondary store, such as θ, are employed in directory 63 to control the selection of "identifiers" (PBT for example) of data stored at location θ in the secondary store, and also to select status indicators, designating the "full" or "empty" status of that address θ in the secondary. Such "identifiers" can be written in, read out or erased and the "full" or "empty" status indicators altered.

In normal operation, assuming that information having the identifier PBR has been addressed, the main store is searched for the PBR identifier and accompanying data. If it is *not* found in the main store, a transfer operation is initiated.

During this transfer operation, a location in the main store is chosen for clearance, e.g., address NSC, and the data from the chosen location, e.g., denoted by identifier PBT, is removed to and stored in the first available empty location in the secondary store. Identifier PBT (per se) which is stored in register 56 at a location selected by MSC, is read out under control of MSC. The first available address in the secondary store, to which the PBT data will be moved, is indicated by $\theta$. A manifestation of $\theta$ is used to control the address selecting means of register 63 so that at the location in 63 assigned to $\theta$, a test is made of the "full" or "empty" status of $\theta$. If it is "empty" the indicator is changed to "full" and PBT (per se) is inserted at this location. The "identifier" PBT is used to control register 70 to select a location therein at which the address $\theta$, per se, is caused to be stored. A manifestation of $\theta$ is also employed to control the transfer of data from the location in the main store, which is thus cleared, to the address $\theta$ in the secondary store. At this time the directory 63 now indicates that the data identified by PBT moved from the cleared space in the main store, is now stored in the secondary at $\theta$, and directory 63 indicates that $\theta$ is "full."

After the location in the main store has been cleared, the desired data (identified by PBR) is transferred (as set forth below) from the secondary store to the cleared location in the main store.

MSC is again employed to control directory register 56 to write in, at the location in 56 assigned to MSC, the "identifier" PBR, per se. As stated above this PBR is the "identifier" of the piece of data originally searched for in the main store and not found therein and it is assumed to be stored, in the secondary, at an address indicated by SSR. The "identifier" PBR is read out of 56, under control of MSC and is employed to control directory 70 to pull out SSR, per se, stored at the location in 70 assigned to PBR and erase SSR.

Under control of SSR, the directory 63 is controlled to select the location therein, allocated to SSR, at which location PBR, per se, was previously stored and erases PBR and changes the status indication from "full" to "empty."

Under control of SSR a piece of data, identified by the "identifier" PBR is transferred from the secondary address SSR into the cleared location in the main store.

MSC is again employed to control 56 to read out PBR and use it to condition the memory-comparator circuits, so that, when normal operation is resumed, that piece of data, identified by PBR, will be found at the address MSC in the main store.

Thus, in summary, a space has been cleared in the main store, the piece of information originally stored in this cleared space, has been identified, and there also has been stored in the directory an indication that this identified, cleared out piece of data, is at $\theta$ in the secondary. The piece of data desired (identified by PBR) has been transferred from the address SSR, in the secondary, to the cleared address in the main store, and there also has been stored in the directory the indication that SSR is now "empty." There is also stored in the directory 56 the "identifier" PBR, at the location in 56 assigned to MSC, so that, when normal operation is resumed, the piece of data, identified by PBR, from the main memory, can now be found. The directory 56 stores the "identifier" PBR at the location therein, assigned to MSC.

Provision therefore is made, to keep track of the "identifiers" of the data and where this identified data is stored, in the main and secondary stores and also the status ("full" or "empty") of the addresses in the secondary store and also the addresses in the secondary store at which the identified data is stored and ditto for addresses in the main store.

During each automatic transfer period, although suspension of normal machine operation to obey the current order in the control system 14 is necessary on account of the absence of the required data word called for by the address digits of that current order, use of much of the normal parts of the machine including the main store and the control circuits is not required except during the actual word transfer periods. In the remaining and considerable spare time intervals, these machine parts can be usefully employed to carry out other machine instructions, for example, part of one or more alternative but lower priority programmes. Alternatively, such spare time can be employed in conjunction with a third control system to organise transfers to or from further subsidiary storage such as magnetic tape storage or with the use of other peripheral equipment.

Many modifications of the arrangements described above may be made without departing from the scope of the invention. For example, the use of a separate transfer instruction register 47 is not essential although its provision facilitates the use of the machine for other purposes during the transfer operation period. The functions of such register 47 can be carried out by the normal instruction register 14 by suitable extension of its address selection and function control arrangements. Again, the various registers 63, 70, 56 and even 49 can be provided by a single storage device of suitable word capacity. The invention is also clearly applicable to serial type machines by appropriate organisation upon a controlled timing basis instead of upon distribution of different digits among a group of isolated digit conductors.

We claim:

1. An electronic digital computing machine which includes an immediate or high access speed main date word store for registering data words, each identified by a program identification address, to be used in a currently operative computing programme, a secondary data word store of a type in which the various storage locations or addresses are designated by secondary store addresses and become available sequentially, two-way word transfer channels between said main and secondary stores, control means for effecting transfer of data words from said secondary store to said main store and from said main store into that one of the address locations of said secondary store which is already unoccupied and is next available after the time of a requirement to effect transfer, and directory register means for recording the programme identification address of each of said transferred data words and the secondary store address to which each of said data words has been transferred.

2. An electronic digital computing machine according to claim 1 in which said main and secondary stores have a plurality of storage block locations for registering a predetermined number of data words and each transfer operation between said main and said secondary stores comprises the sequential transfer of a predetermined number or block of separate data words from a location designated in said main store by a programmed identification address to the next available unoccupied secondary store location.

3. An electronic digital computing machine according to claim 2 which includes means for providing a position-indicating signal indicative of the identity of the next block storage location about to become accessible in said secondary store before said block storage location actually becomes accessible for writing thereinto or reading therefrom.

4. An electronic digital computing machine according to claim 3 in which said directory register means includes means for retaining a record of the full or empty state of each of said block storage locations in said secondary store.

5. An electronic digital computing machine according to claim 4 which includes means for examining said directory register means to determine the full or empty state of the secondary store block storage location identified by said position-indicating signal and, in the event that such examination indicates a full state for such identified block storage location, for further examining said directory register means to determine the full or empty states of the secondary block storage locations which will become accessible in succession after said signal-identified location and prior to the arrival of the position-indicating signals identifying such locations, until a block storage location having the empty state is discovered.

6. An electronic digital computing machine according to claim 3, including address selection means for said directory register means and in which said position-indicating signal is of a form suitable for use as an address selecting signal for operating said address selection means.

7. An electronic digital computing machine according to claim 6 in which said secondary store is of the magnetic drum type and in which said position-indicating signal is provided by reading from a series of stored position signals therein.

8. An electronic digital computing machine according to claim 2 in which said directory register means comprises a multiple address word storage device having a separate word storage location for each block storage location in said secondary store, said word storage device including address selection means operative by an address signal representative of the block identification number of said block storage position of said secondary store and each word storage location being arranged to record the programme block address number of any block of data words registered in said block storage location of said secondary store.

9. An electronic digital computing machine according to claim 2 in which said directory register means comprises a multiple address word storage device having a separate word storage location for each identifiable block of storage positions available in the machine for storage of data words, said word storage device including address selection means operative by an address signal representative of the programme block address number of each of the available storage block positions and each word storage location being arranged to record the storage block position in said secondary store where said block of data words is temporarily registered.

10. An electronic digital computing machine according to claim 2 wherein said control means includes a separate transfer instruction store for transfer of data words or blocks of data words between said main and said secondary stores automatically by machine control using a series of separate predetermined transfer instructions held in said separate transfer instruction store.

11. An electronic digital computing machine according to claim 10 which includes a normal instruction register operatively connected to said main store, said control means including a transfer instruction register separate and distinct from the said normal instruction register of the machine.

12. An electronic digital computing machine according to claim 11 which includes a separate transfer control register co-operating with said transfer instruction register and said transfer instruction store.

13. An electronic digital computing machine according to claim 10 which includes a further separate data word store for use during the automatic transfer operation, said separate transfer word store being not available for selection of any address therein by any normal instruction during normal operation of the machine to perform a computing operation.

14. A data storage and handling system including storage and directory means and means for changing the operation of said system from normal operation to a transfer mode of operation and back to normal operation, said system comprising a first addressable data store and means for selecting addresses in said store, a second addressable data store and means for selecting addresses in said store, means for ascertaining the successive addresses, available in said second store and producing indications of said respective addresses, two-way transfer channels between said stores and means for effecting transfer of data from said first store to said second and vice versa via said channels, first directory means having addressable locations therein, each allocated to respective addresses in said first store and address selection means controlled by manifestations of said addresses for selecting respective allocated locations, second directory means having addressable locations therein each allocated to respective identifiers of data and address selection means controlled by manifestations of said respective identifiers, third directory means having addressable locations therein, each allocated to addresses in said second store and for storing indications of full or empty status of said addresses, respectively, and address selection means controlled by respective manifestations of said second store addresses, means for writing, erasing and reading out identifiers from the allocated locations of said first directory means under control of manifestations of addresses applied to said address selection means, means for writing, erasing and reading out address indications in said second directory means under control of manifestations of identifiers, means for writing, erasing and reading out identifiers from the allocated locations of said third means and for ascertaining the full or empty status of secondary store addresses and for altering said full or empty status under control of manifestations of such secondary store addresses, means under control of the respective address selection means of said first store and said second store for storing and extracting identified data in said stores, respectively, means controlled by one identifier and cooperating with said address selection means of said first store, to search for, during normal operation of said system, data identified by said one identifier, means producing a not-found indication upon non-discovery of said identified data in said first store, means controlled by said not-found indication to change the operation of said system from said normal to said transfer mode of operation, means rendered operative during said transfer mode of operation to produce an indication of an address in said first store to be cleared of data stored thereat, and means controlled by said last mentioned indication and including said address selecting means of said first directory means to render said "read out" means of said first directory means operative, to read out an identifier stored therein, means including the address selecting means of said third directory means and its status ascertaining means, operative under control of an indication of a first available address in said second store, for testing said full or empty status indication and effective upon ascertainment of an empty status indication, to change said empty status indication, to full, and controlling its writing means to write the identifier of said data to be cleared, means controlled by said empty ascertainment and including said second store address selection means for transferring said data from said to be cleared location in said first store to said second store at said first available address, means controlled by the identifier of said data to be cleared and including said address selecting means and said write means of said second directory means to write therein the address of said available empty location in said second store, means controlled by the address of said cleared location and including said address selecting means and said writing means of said first directory means to insert therein a second identifier, identifying the data in said second store to be transferred to said first store, means controlled by said second identifier including said address selecting means and said read and erase means of said second directory means to read therefrom the indication of the address in said secondary store at which said second identified data is stored, and erasing said indication of said address from said second directory means, means controlled by a manifestation of said last address and including said address selecting means and said status altering means of said third directory means to change the corresponding status indication from full to empty, and means including said address selecting means of said second store and controlled by a manifestation of said same last address to transfer the data stored at said address in said second store to said cleared address in said first store, means rendered effective by a manifestation of said cleared address and including said address selecting means of said first directory means and its read out means, to read out from said first directory means said second identifier and to condition the address selecting means of said first store, and means rendered effective upon completion of said transfer from said second to said first store to return said system to its normal mode of operation.

15. A data storage and handling system including storage and directory means and means for changing the operation of said system from normal operation to a transfer mode and back to normal operation, said system comprising a first addressable store and means for selecting addresses in said store, a second addressable data store and means for selecting addresses in said store, means for ascertaining the successive addresses available in said second store and producing indications of said respective addresses, two-way transfer channels between said stores and means for effecting transfer of data from said first store to said second and vice versa via said channels and addressable directory means including means controlled by manifestations of addresses in said second store, said directory means registering the full or empty status of the address locations of said secondary store and registering the identifiers of data at the respective addresses, when full, and registering an empty status therefor when empty and said directory means further including addressable means controlled by manifestations of identifiers to register in said further means the address in said second store, with which said identified data is associated.

16. A device as in claim 15, said directory means including further addressable means controlled by manifestations of addresses in said first store, for storing the respective identifiers of data associated with addresses in said first store.

17. A device as in claim 15 and including means for indicating the next available address in said second store, and means including said first directory means and controlled by a manifestation of said address to check the full or empty status.

18. A device as in claim 17 and including means operative upon ascertainment of a full status, for ascertaining the still next available address in said second store and ascertaining its full or empty status.

19. A device as in claim 17 and including means operative upon ascertainment of an empty status and including the address selecting means of said second store, to move data from a selected address in said first store to said second store.

20. A device as in claim 19 and including said first directory means, for changing the empty status, of said address in said secondary, to full.

21. A device as in claim 16 and including additional directory means controlled by manifestations of identifiers read from said further directory means, and means controlled by said manifestations of said identifiers to record in said further directory means the address in said secondary store associated with said identified data.

22. A device as in claim 21, said additional means being operative under control of a manifestation of an identifier for reading out the address indication, per se, of said second store associated therewith and means including said address selecting means of said first directory means to change the status associated with said address just read out, from full to empty.

23. A device as in claim 21 and including means for transferring from said secondary store the data located at said secondary address.

24. A data storage and handling device comprising a first addressable data word store for storing data words to be used in a currently operative computing program, a second addressable data word store whose addresses become sequentially available, comparing means coupled to said first store to compare an operative program data address with the program addresses of data in said first store and to produce a non-coincidence signal if said operative program data address identified data is not found in said first store, directory register means for recording the program address of data associated with each address of said second store, bilateral data transfer channels connected between said first and second stores, data transfer control means coupled to said directory register and to said data transfer channels and responsive to said non-coincidence signal, for searching said directory register for that one of the address locations in said second store which is unoccupied and is next available after the generation of said non-coincidence signal and for effecting a transfer of data from said main store to said next unoccupied location.

References Cited by the Examiner

UNITED STATES PATENTS

| | | | |
|---|---|---|---|
| 2,847,657 | 8/1958 | Hartley et al. | 340—172.5 |
| 2,892,184 | 6/1959 | Joel et al. | 340—172.5 |
| 2,984,827 | 5/1961 | Trapnell et al. | 340—172.5 |
| 2,994,065 | 7/1961 | Thomas et al. | 340—172.5 |
| 2,996,699 | 8/1961 | Koramskoy | 340—172.5 |
| 3,018,472 | 1/1962 | Piloty | 340—172.5 |
| 3,042,902 | 7/1962 | Weida et al. | 340—172.5 |
| 3,045,217 | 7/1962 | Housman et al. | 340—172.5 |

ROBERT C. BAILEY, *Primary Examiner.*

WALTER W. BURNS, Jr., *Examiner.*